US009477798B1

(12) United States Patent
Guoy et al.

(10) Patent No.: US 9,477,798 B1
(45) Date of Patent: Oct. 25, 2016

(54) MOVING MESH SYSTEM AND METHOD FOR FINITE ELEMENT/FINITE VOLUME SIMULATIONS

(75) Inventors: Damrong S. Guoy, San Jose, CA (US); Mark Donald Johnson, Mountain View, CA (US); Zhiqiang Tan, San Jose, CA (US); Luis Villablanca, Mountain View, CA (US); Satish Chalasani, Sunnyvale, CA (US); Simeon Dimitrov Simeonov, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 457 days.

(21) Appl. No.: 13/507,310

(22) Filed: Jun. 20, 2012

(51) Int. Cl.
*G06G 7/48* (2006.01)
*G06F 7/60* (2006.01)
*G06F 17/50* (2006.01)
*G06T 17/20* (2006.01)

(52) U.S. Cl.
CPC .......... *G06F 17/5018* (2013.01); *G06T 17/20* (2013.01); *G06T 17/205* (2013.01); *G06F 2217/16* (2013.01)

(58) Field of Classification Search
CPC .......... G06F 17/5018; G06F 2217/16; G06T 17/20; G06T 17/205
USPC .............................. 700/121; 703/2, 7, 12, 13
See application file for complete search history.

(56) References Cited

U.S. PATENT DOCUMENTS 5,930,494 A * 7/1999 Akiyama ........................ 703/7
7,996,795 B2   8/2011 Moroz et al.

OTHER PUBLICATIONS

Avci et al., Three-dimensional TCAD Process and Device Simulations, University Government Industry Microelectronics Symposium (Jun. 2005).*
Senez et al., 3-Dimensional Simulation of Thermal Diffusion and Oxidation Process, Tech. Dig.—Int. Electron Devices Meet. 1996.*
Villablanca, Mesh Generation Algorithms for Three-Dimensional Semiconductor Process Simulation, Chapter 5, 2000.*
Strecker et al., A 3D moving grid algorithm for process simulation, J Comput Electron (2006) 5:297-300 DOI 10.1007/s10825-006-0004-y.*
Baker T., "Mesh Movement and Metamorphosis," Engineering with Computers, vol. 18:3 (2002) pp. 188-198.
Guoy D., et al., Chapter 5B.1, "Parallel Mesh Adaptation for Highly Evolving Geometries with Application to Solid Propellant Rockets," ed. Brewer M., Proc. 16th Intl. Meshing Roundtable, 2008, Session 5B, pp. 515-534.
Giraud-Moreau L. et al., "A Remeshing Procedure for Numerical Simulation of Forming Processes in Three Dimensions," ed. Pebay P., Proc. 15th Intl. Meshing Roundtable, 2006, Session 1B, pp. 127-143.

(Continued)

*Primary Examiner* — Aniss Chad
(74) *Attorney, Agent, or Firm* — Haynes Beffel & Wolfeld LLP

(57) ABSTRACT

Roughly described, the invention involves detecting the presence of features on the boundary mesh which are likely to hamper regeneration of a bulk mesh with high quality elements, and upon finding such features, performing a repair operation on the boundary mesh prior to bulk mesh regeneration. The repair operation can include smoothing knife edge features and/or handling topological changes that have occurred during the simulation time increment. Preferably the repair operation includes a multi-level set smoothing step and a Delaunay refinement step for piecewise smooth complex.

41 Claims, 9 Drawing Sheets
(3 of 9 Drawing Sheet(s) Filed in Color)

(56) References Cited

OTHER PUBLICATIONS

Dheeravongkit A. et al., "Inverse Pre-deformation of Finite Element Mesh for Large Deformation Analysis," Proc. 13th Intl. Meshing Roundtable, 2004, pp. 81-94.

Wan J. et al., "Automated Adaptive Forming Simulations," Proc. 12th Intl. Meshing Roundtable, 2003, pp. 323-334.

Synopsys, Inc., "Three-dimensional Simulations of Strained-Silicon CMOS Devices," (2007) 6 pp www.synopsys.com/Tools/TCAD/CapsuleModule/cmos_devices.pdf, visited May 25, 2012.

Dey T., et al., "Delaunay Meshing of Piecewise Smooth Complexes without Expensive Predicates," Algorithms, vol. 2, issue 4 (2009), 1327-1349. doi:10.3390/a2041327. Technical report OSU-CISRC-7108-TR40, Jul. 2008.

Cheng S-W., et al., "A Practical Delaunay Meshing Algorithm for a Large Class of Domains," Proc. Intl. Meshing Roundtable (2007) pp. 477-494.

Kao D-B. et al., "Two-Dimensional Silicon Oxidation Experiments and Theory," paper 14.6, IEDM 1985, pp. 388-391, with better copies Figs. 2(a), 2(b) and 3 appended.

Strecker N. et al., "A 3D moving grid algorithm for process simulation," J. Comp. Elec., vol. 5:4 (2006) pp. 297-300; ed. Kosina H., Special Section: Special Issue on the Proc. of the Intl. Workshop on Computational Electronics (IWCE-11) Part 1.

Moroz, V. et al., "Modeling the impact of stress on silicon processes and devices," Materials Science in Semiconductor Processing, vol. 6(1-3), Feb.-Jun. 2003, pp. 27-36.

Simeonov S., et al., "Investigation of Proximity Effects in a 6T SRAM Call Using Three-Dimensional TCAS Simulations," IEEE Trans. on Electron Devices, vol. 58:4, Apr. 2011, pp. 1189-1196.

Fiedler R.A. et al., "Simulations of Slumping Propellant and Flexing Inhibitors in Solid Rocket Motors," Center for Simulation of Advanced Rockets, Amer. Inst. Aeronautics and Astronautics Paper 4341, 2002, 11 pp.

Tan Z. et al., "CFD-Micromesh: A Fast Geometric Modeling and Mesh Generation Tool for 3D Microsystem Simulations," Technical Proc. of the 2000 Int'l Conf. on Modeling and Simulation of Microsystems, Mar. 2000, Ch. 17, pp. 712-715.

Chalasani S. et al., "Quality improvements in extruded meshes using topologically adaptive generalized elements," Int. J. Numer. Meth. Engng 2004; 60:1139-1159.

Villablanca L., "Mesh Generation Algorithms for Three-Dimensional Semiconductor Process Simulation," (2000) (unpublished Ph.D. dissertation, Swiss Federal Inst. of Tech., Zurich) (on file with SFIT as DISS. ETH Nr. 13634) abstract only, 1p + cover sheet.

Deal B.E. et al. "General Relationship for the Thermal Oxidation of Silicon" Journal of Applied Physics, vol. 36, No. 12, Dec. 1965, pp. 3770-3778.

Synopsys, Inc., Sentaurus Process release E-2010.12 (Dec. 2010).

Synopsys, Inc., Sentaurus Process release F-2011.09 (Sep. 2011).

Sentaurus Process User Guide, Version E-2010.12, Dec. 2010, Synopsys, Inc., title page, copyright page, and pp. 591-605.

* cited by examiner

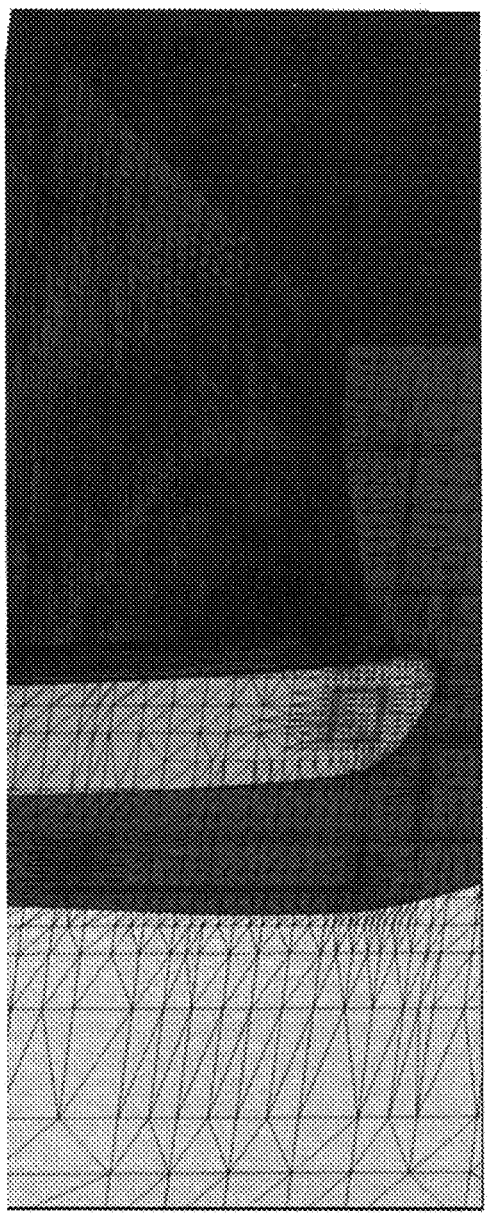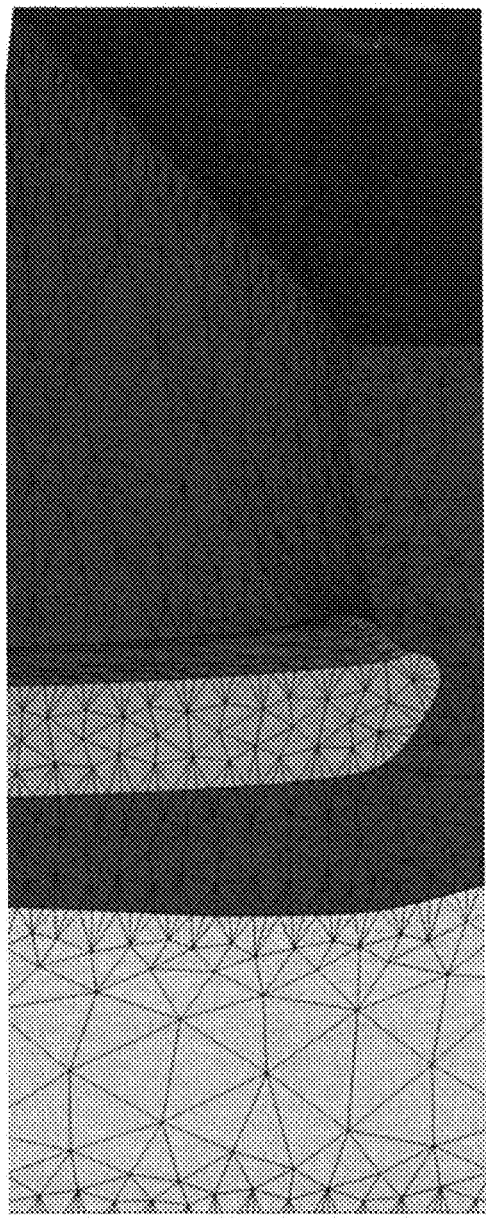
FIG. 8A
FIG. 8B

MOVING MESH SYSTEM AND METHOD FOR FINITE ELEMENT/FINITE VOLUME SIMULATIONS

BACKGROUND

Embodiments of the invention relate to methods and systems for improving the modeling of integrated circuits through improved modeling of material conversions such as oxidation, silicidation, and amorphization and epitaxial recrystallization of semiconductors.

DESCRIPTION OF RELATED ART

Technology Computer Aided Design (TCAD) is a system that uses finite element or finite volume analysis methods for simulating and modeling the evolution of fields through a body during the process steps performed in the fabrication of integrated circuits. The migration or diffusion of dopants and defects, the implantation of ions, amorphization and recrystallization, mechanical deformation, and material reactions, among other things, all can be modeled using TCAD. These simulations have become a critical part in the development of better, more reliable and higher yielding fabrication processes, and ultimately in the prediction of macro-level parameters for devices to be manufactured using the process. The macro-level parameters include, for example, electron mobility, leakage and threshold voltage of transistors, as well as mechanical stresses. The macro-level parameters are then used by designers to select transistors and other devices for use in an integrated circuit design, and to simulate circuit behavior to ensure its correctness and reliability.

While some types of simulations can be performed in two dimensions, the most accurate simulations require three dimensional modeling of the body being analyzed. Three dimensional analysis is vastly more complex and time consuming than two-dimensional analysis. Since the first 3D simulators became available, a critical limitation has been the accurate simulation of process steps in an environment in which boundaries between materials are moving. Examples include mechanical deformation, and such process steps as oxidation, in which the boundary between silicon and oxide moves into the silicon as silicon is consumed and oxide is formed; silicidation, in which the boundary between silicon and a metal moves into the metal layer as metal is consumed and silicide is formed; doped epitaxial deposition, in which materials grow on a surface; and amorphization and epitaxial recrystallization of semiconductors, in which the boundary between amorphous and crystalline materials moves. Simulation of these process steps require the simultaneous solution of moving boundaries and dose conserving dopant diffusion and segregation equations. While the solution of such equations in 2D has been available for many years, the extension to 3D has been hampered by extreme difficulties in handling the moving mesh. Various existing 3D simulators have been able to move boundaries and solve material reactions, but doing so while simultaneously solving dose conserving diffusion and dopant segregation equations has not been reliable. Such simulators therefore usually have been considered useless for most 3D oxidation and other moving boundary simulations. For some types of devices and processes, simulations simply cannot be performed in current technology because of the inability to correctly simulate the process in 3D with a moving boundary.

SUMMARY

An opportunity therefore arises to create robust three dimensional simulations in an environment of moving material boundaries during the integrated circuit fabrication process steps. Better chip yields, and denser, and more powerful circuits, components and systems may result.

Experience from 2D moving boundary algorithms, specifically the solution of oxidation in 2D, has shown that the following constraints must be met in order to obtain an accurate solution:

1. Dopants profiles can be extremely steep near the moving boundary (the oxide/silicon interface in the case of oxidation). Changing the mesh, specifically the mesh points, in such areas will lead to inaccurate results and possible dose errors. This is because of the need to interpolate dopant values after mesh changes. In order to represent these profiles efficiently on a mesh, mesh points should be kept and moved with the material (this is known as the Lagrangian method).

2. The segregation of dopants from silicon to oxide and vice-versa causes an abrupt change in concentration at the interface. In order to represent this abrupt change, two values can be stored at the interface: one on each side of the moving boundary. Optionally, a third value sometimes can be used to solve for an independent interface concentration. To solve segregation accurately, the discontinuity in dopant concentration at the boundary should be captured. This can be accomplished with the use of a boundary fitted mesh (a mesh in the material volume that has a surface coinciding with the actual boundary).

3. Reactions such as oxidation and silicidation have an interface where one material is being consumed and a new material is produced, which in general has a different density from the consumed material. Therefore the reaction causes expansion or contraction which deforms the new material and any layers on top of the new material. A mechanics solver can be used to model this deformation, using the same mesh.

4. Material reaction and mechanical deformation of materials result in mesh deformation which in turn changes the "control" volumes, i.e. that part of the total volume ascribed to each vertex in the mesh. Since the dose is just the product of concentration and control volume, it is important to account for this volumetric change in the solution of the dopant equations to maintain the total dose. Also, the material consumption from the reaction requires dopants to be transferred from one material to the other to the extent that dopants are not consumed in the reaction.

5. Mesh quality must be maintained in order to achieve solution accuracy. In order to produce a high quality mesh, good boundary quality must also be maintained. This last observation is the primary focus of embodiments of the present invention.

Roughly described, the invention involves detecting the presence of features on the boundary mesh which are likely to hamper regeneration of a bulk mesh with high quality elements, and upon finding such features, performing a repair operation on the boundary mesh prior to bulk mesh regeneration. The repair operation can include smoothing knife edge features and/or handling topological changes that have occurred during the simulation time increment. Preferably the repair operation includes a multi-level set smoothing step and a Delaunay refinement step for piecewise smooth complex.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be described with respect to specific embodiments thereof, and reference will be made to the drawings, in which.

DETAILED DESCRIPTION

Figure 1:
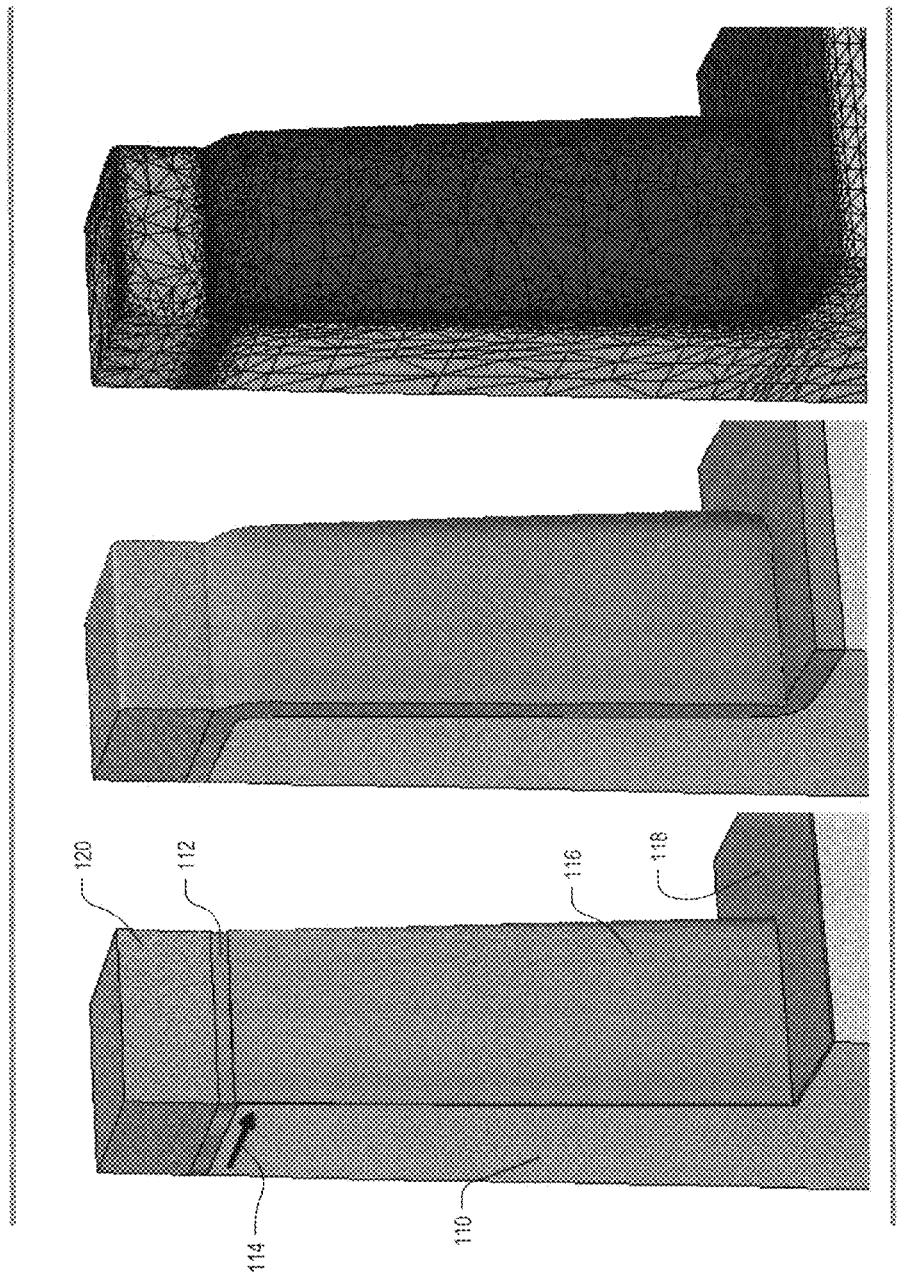
FIG. 1 (consisting of FIGS. 1A, 1B and 1C) shows a typical 3D oxidation step seen commonly in a modern CMOS process.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Various embodiments describe the modeling of material conversion. The pre-conversion material occupies a first space having a first boundary. The post-conversion material occupies a second space having a second boundary. The first and second spaces are different, because the first and second materials occupy different volumes. The material conversion is transformed as follows.

Prior to the transformation, the model represents a physical body undergoing a material conversion of a first material in the integrated circuit to a second material in the integrated circuit. Prior to the material conversion, the first material occupies a first space having a first boundary, and the second material occupies a second space having a second boundary. The representation in the model identifies the pre-conversion state of the materials and their boundaries. After the material conversion the first material and the second material occupy third and fourth spaces, respectively, and have respective third and fourth boundaries. The simulator evolves the pre-conversion representation to a new representation in the model which identifies the post-conversion state of the materials and their boundaries. The model may also contain values representing the values of various fields within the body, such as dopant, defect and stress levels. These field values also evolve during the simulation, such that prior to the simulation they represent the state of the fields prior to the transformation, and after the simulation they represent the state of the fields after the transformation.

The following lists various examples of material conversions from the first material to the second material, and the corresponding identities of the first material and the second material.

In one embodiment, the first material is silicon, the second material is silicon oxide, and the material conversion of the material is growth of silicon oxide on the silicon.

In one embodiment, the first material is semiconductor, the second material is oxide, and the material conversion of the material is growth of the oxide on the semiconductor.

In one embodiment, the first material is silicon oxide on silicon, the second material is additional silicon oxide, and the material conversion of the material is growth of the additional silicon oxide on the silicon oxide on the silicon.

In one embodiment, the first material is oxide on semiconductor, the second material is additional oxide, and the material conversion of the material is growth of the additional oxide on the oxide on the semiconductor.

In one embodiment, the first material is crystalline semiconductor, the second material is semiconductor amorphized by ion implantation, and the material conversion of the material is epitaxial recrystallization of the amorphized semiconductor.

Silicidation is similar to oxidation, except that metal atoms react with silicon instead of the oxygen. For example, to form nickel silicide a film of nickel is deposited on top of silicon. When heated up, the nickel atoms react with silicon atoms to form one of the nickel silicide phases: NiSi or Ni2Si or NiSi2 depending on the processing conditions. The volume of NiSi is much larger than the sum of the volumes of the original Ni and the consumed silicon; therefore there is a transformation involving growth of nickel silicide and consumption of nickel and silicon. Besides nickel, the industry also has been using tungsten or cobalt or platinum to form silicides. If applied to germanium instead of silicon, the result is germanide instead of silicide.

FIG. 1 (consisting of FIGS. 1A, 1B and 1C) shows a typical 3D oxidation step seen commonly in modern CMOS processes, namely the liner oxidation of a shallow trench isolation (STI) structure. FIG. 1A illustrates the starting structure after a native layer of $SiO_2$ has been deposited. The region 110 represents the bulk and the layer 112 above it is an oxide layer. The dissolved oxygen concentration within the oxide layer 112 increases from the unexposed rear of the structure toward the exposed front of the structure, as indicated by arrow 114. Region 116 represents the native oxide layer that has been deposited on the trench sidewall (front surface in the drawing), and region 118 represents the native oxide layer that has been deposited on the trench floor. The rectangular region 120 above the oxide layer 112 represents $Si_3N_4$ which suppresses oxidation, especially away from the exposed front surface (i.e. toward the rear of the structure in the drawing).

FIG. 1B illustrates the completed simulation. It can be seen that the oxide regions 112 and 116 have grown forward and merged at their interface. The front part of the nitride layer 120 has also lifted slightly due to vertical movement of the oxide/nitride boundary near the front surface. A portion of the silicon behind the sidewall oxide 116 has been consumed and converted to oxide, resulting in movement of the silicon/oxide boundary surface rearward into the silicon region 110. Because oxide has a lower density than silicon the oxide layer also has thickened, resulting in movement of the front surface in the forward direction. Similarly, oxide layer 118 on the floor of the trench has expanded both upwards and also downwards into the silicon region 110. In addition, in the inner (concave) corner at the bottom, the thickness is reduced because the stress is concentrated there whereas in the outer (convex) corner at the top growth is slightly enhanced because of decreased stress.

FIG. 1C illustrates the mesh superimposed on and within the structure of FIG. 1B. Although only those mesh edges which coincide with the visible surfaces of the structure are visible in the drawing, it will be understood that the mesh extends throughout the volume of the structure. Though not required in every embodiment, each of the volumetric elements defined by the mesh in FIG. 1C is a tetrahedron. In the embodiment of FIG. 1C, the model representing the structure of FIG. 1B is provided as a database indicating the positions of all the mesh vertices and their connections to other vertices. Except for stress levels, which are computed and stored in conjunction with the elements themselves, all other relevant field values, such as dopant concentration, defect information, reaction element concentrations, and interim material flow velocities, are stored in conjunction with the vertices. These values indicate the corresponding values at the corresponding points within a physical structure after the physical transformation that occurs in the liner oxidation step. A similar mesh existed for the pre-transformation version of the structure shown in FIG. 1A, though it is not shown in the figures. The vertices and tetrahedrons of that mesh have different positions than those of the post-transformation mesh, but the values associated with the elements and vertices have the same meaning with respect to the points in the pre-transformation structure that they represent. In another embodiment, the field values can be associated with other parts of the tetrahedrons, such as the edges or the centroid.

The remainder of the present description often refers to points, surfaces, volumes, concentrations and so on, as well as their movement or transformation, without necessarily specifying whether the features they refer to are physical or simulated. Unless otherwise specified, it will be understood that they refer to simulated features which represent physical features of a physical structure.

The task of the oxidation meshing module in an embodiment is to move a body fitted mesh boundary into a highly refined bulk mesh while maintaining positive element volumes and avoiding very small angles. This task is especially difficult near 3D corners and ridges several of which can be observed in FIG. 1. The embodiment uses a 3D Delaunay tetrahedral mesh which is, to the extent possible, axis aligned. A Lagrangian method is used for solving the moving boundary, which means that mesh points move with the material. During oxidation and silicidation, silicon is consumed and new material is created. The silicon itself moves very little during the reaction in part because it is stiffer than oxide or silicide, so the reaction boundary must pass through a nearly static mesh while maintaining reasonable quality elements for simulation accuracy.

This set of constraints has in the past presented a very large hurdle that previous attempts at using the standard oxidation method in 3D could not overcome. The process of preparing the mesh for movement (by removing points in front of the moving boundary and eliminating slivers, etc.) was too difficult to solve in a robust manner. Prior methods would try cutting the time increment in order to avoid tetrahedral inversion, but too often the time increment had to be reduced to such a small duration that the simulation would never complete. Embodiments of the present invention are able to overcome this difficulty in most or all cases.

Figure 2:
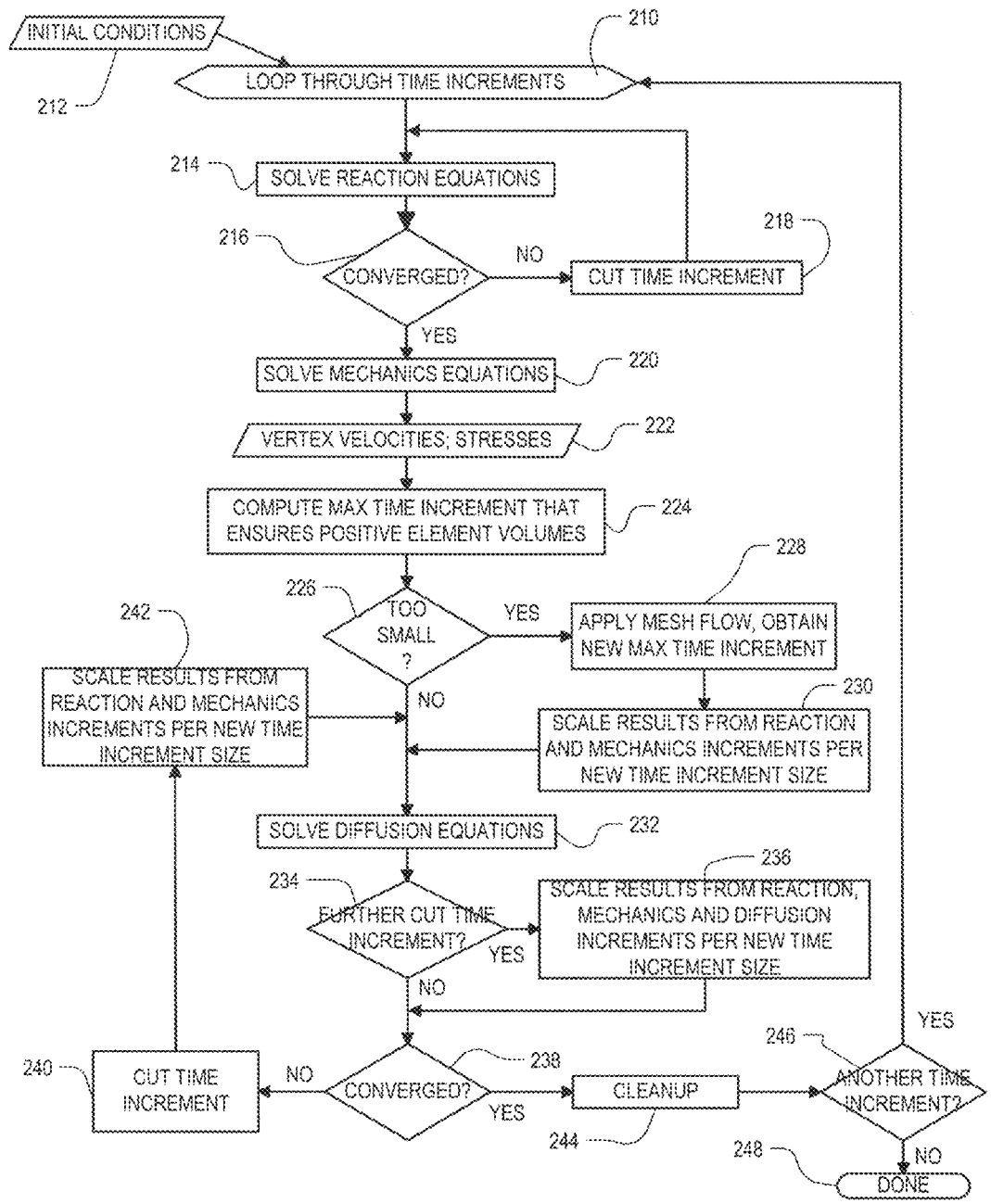
FIGS. 2-4 are flow charts collectively describing a simulation method incorporating features of the invention.

FIG. 2 is a flow chart of an overall method for simulating the evolution of a process step that includes dopant diffusion in the context of moving boundaries. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

The method of FIG. 2 uses a known practice of maintaining the boundary representation separately from the bulk mesh. The bulk mesh is three dimensional and is much finer near boundaries, corners and other features at which the field values change steeply. The boundary interfaces are represented as a non-manifold surface triangulation mesh. Though not required in all embodiments, in the present embodiment all field values are associated with the vertices of the bulk mesh, not those of the boundary mesh; the boundary mesh vertices identify only their positions. In broad overview, time increments are iterated on the bulk mesh with knowledge of the moving boundary interface positions, and then the boundary interfaces are moved in accordance with the displacements determined by the bulk mesh calculations. Finally the bulk mesh is updated so as to have internal surfaces that coincide with the boundary interfaces, and the iteration repeats with the next time increment. As used herein, an "interface" is the boundary between first and second materials, as understood by the simulation. The "interface" moves from one "surface" to another during the process step simulation. The term "surface" is used herein to refer to a specific position, orientation and shape of an interface (or indeed of anything else) in three dimensions. A "surface" need not necessarily be a manifold, and in the present embodiment typically it is not. During a simulation, the system proceeds through a plurality of time increments and calculates, after each time increment, a new "surface" with which the "interface" coincides after the time increment.

The method also maintains a copy of all vertex locations and mesh connectivity in order to reproduce as much as possible the bulk mesh during the cleanup operation. For the purposes of this discussion, it will be assumed that the process step being simulated involves dopant diffusion in a body in which silicon is being oxidized at a material boundary interface.

In step 210 the system begins a loop through the time increments. Initial conditions 212 are provided, such as initial bulk and boundary meshes, initial values on the vertices of the bulk mesh, and ambient conditions. The ambient conditions include such information as free O2 outside the body, pressure and temperature.

In step 214 the system solves the reaction equations based on the ambient conditions and the initial concentrations of oxygen at each bulk mesh vertex. Step 214 results in new oxygen concentration values at each bulk mesh vertex, as well as the silicon to oxide reaction rate at each vertex on the silicon oxide interface.

It is possible for step 214 to fail to converge on a solution, or can become stuck in a local optimum. In step 216, should this occur, the current time increment is shortened (step 218) and the system returns to step 214 to try again to solve the reaction equations.

In step 220, the mechanics equations are solved. This step calculates material flow velocity vectors at each vertex by rebalancing the stresses that arise due to the material reactions determined in step 214. In the oxidation example, this step typically yields significant velocity in the oxide regions but near-zero velocity in the bulk of silicon. Step 220 yields a piecewise linear velocity field for the current time increment, as well as the mechanical stresses at each vertex point (block 222). Note that the velocity field does not need to be interpolated, thereby avoiding the deleterious effect such interpolation can have on the boundary. Instead, if the diffusion or grid motion modules must limit the time increment, the reaction and mechanics updates are merely scaled linearly by the ratio of the new time increment to the original.

In step 224 the maximum time increment is calculated to ensure a positive volume for all the tetrahedrons. This limitation may shorten the time increment further.

In step 226, if the time increment has become too small, then in step 228 a mesh flow algorithm is applied to slightly perturb the velocities of some problematical vertices which are limiting the size of the time increment. The velocity field permits finding the new locations for each vertex of the bulk mesh by treating each point as a zero mass particle that moves inside the stationary velocity field. High precision trajectory calculation is made possible by a high order Runge-Kutta method. Particle tracing allows bigger time increments because the particle trajectories do not intersect. A new maximum time increment is then determined, up to the same time increment used in step 220. These slight perturbations can often allow much larger time increments than would otherwise be possible. In step 230, the results from step 214 (including oxygen concentrations) are scaled linearly in accordance with the new time increment. The stresses calculated in step 222 are also scaled linearly.

In step 232 the diffusion equations are solved. This step both moves the bulk mesh points in accordance with the vertex velocities and the current time increment size, and also iterates the dopant concentrations at each mesh vertex based on the current time increment size, the scaled stress field, and the prior dopant concentration field, among other factors. Dose conservation is achieved by minimizing the need for interpolation, and also by moving the bulk mesh points with the material. This ensures that the dopant sweeping effect in areas where the material is moving will be captured accurately.

Dopant dose also must be conserved. Dopant concentrations are stored on vertices in the embodiment of FIG. 2, so the dopant dose associated with each vertex is the concentration multiplied by the control volume for each vertex. The control volume is that part of the total volume ascribed to each vertex. The embodiment uses a standard finite volume practice in which the control volume is that volume bounded by perpendicular bisecting planes of the edges attached to a vertex. Because the movement of mesh can cause element volumes to increase or decrease, a correction is needed to prevent changes to the dose. In step 232, the correction is applied by including extra flux terms in the diffusion equation which capture the volume change effect accurately for each vertex.

Finally, consumption at the oxide/silicon interface causes dopants originally in silicon to be incorporated into the oxide as the interface passes by. Step 232 models this effect by using an external flux (from silicon to oxide) in the diffusion equations.

Step 232 can require a still further reduction in the time increment size (step 234), in which case the results from the reaction step 214 and the mechanics step 220 are again scaled. The dopant concentration field changes from step 232 are also scaled in accordance with the new time increment size. (Step 236). If steps 234 and 236 do not permit the solution to converge (step 238), then the time increment is cut again (step 240) and the results from the reaction step 214 and the mechanics step 220 are again scaled (step 242). In this case the system returns to step 232 to again solve the diffusion equations.

If the solution has converged (step 238), then in step 244 the system undergoes a cleanup process described further below. In step 246 the system determines whether more time increments are needed in order to complete the simulation, and if not, then the iterative process of FIG. 2 is complete (step 248). If so, then the system returns to step 210 to begin the next temporal iteration.

Figure 3:
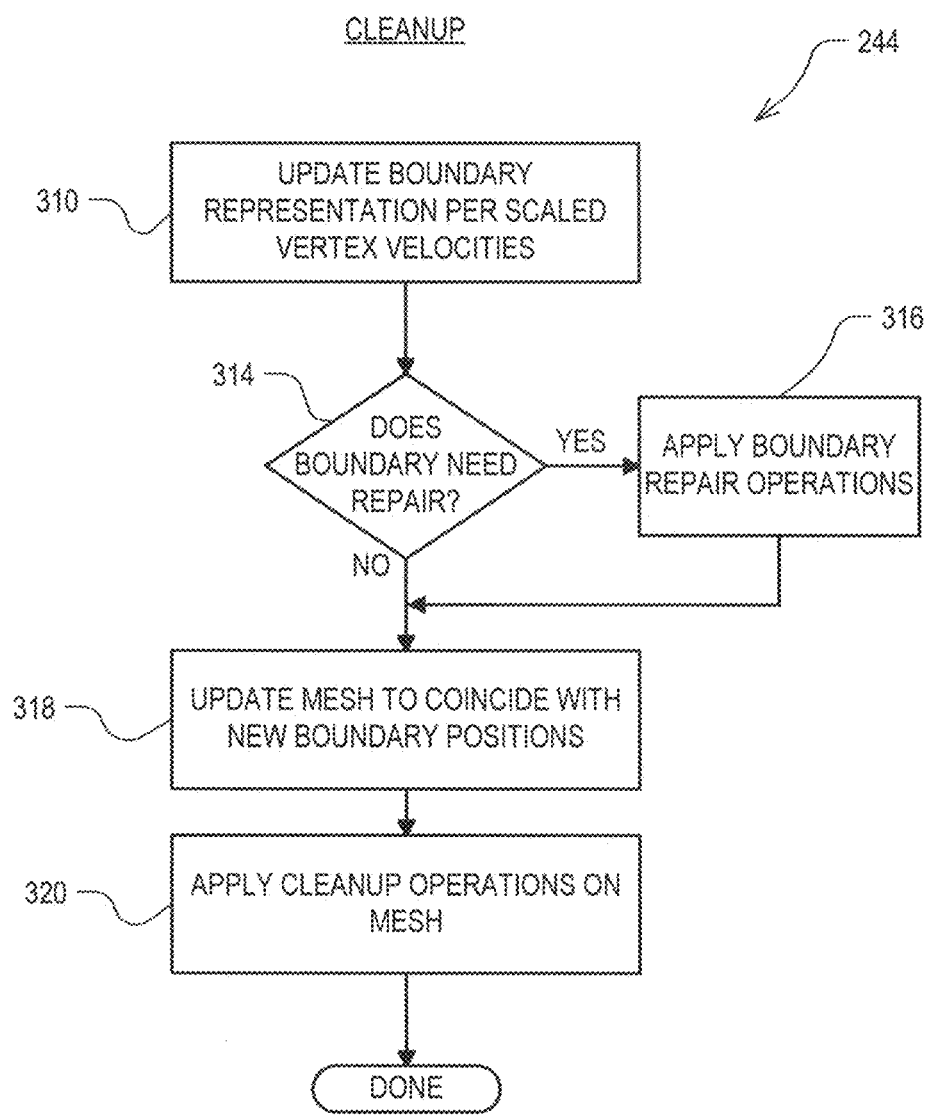

FIG. 3 is a flow chart detail of pertinent parts of cleanup step 244 (FIG. 2). In broad overview, the positions of the vertices in the boundary representation mesh are first updated in accordance with the velocities determined for the corresponding vertices in the bulk mesh (step 310). Then a new bulk mesh is developed so as to have internal surfaces coinciding with the updated boundary interfaces. Finally, the bulk mesh is cleaned up in preparation for the next time increment.

Applicants have appreciated, however, that one of the most important criteria for stable generation of the new bulk mesh with high quality volumetric elements is a smooth boundary mesh, which can roughly be defined as one without small features or small dihedral angles. Yet because of refinement, the boundaries of the bulk mesh used for solving equations often have many small triangles making them problematical for creating a new mesh. In particular, either the physics of the process being simulated, or numeric noise, can create rare events such as the development of self-intersections or extremely sharp ridges (knife edges). Tetrahedrons also can invert. These kinds of features have been found to severely impact the generation of the new bulk mesh, and appear to be the cause of a significant number of the simulation failures not avoided by the other techniques mentioned herein.

Thus in an aspect of the invention, the embodiment of FIG. 2 monitors the quality of the boundary mesh, which is represented as a non-manifold surface triangulation. In step 314, after updating the boundary representation, the embodiment determines whether the boundary mesh requires repair. Preferably one or two, and most preferably all three, of the following conditions indicate a need for repair: a minimum dihedral angle in the boundary mesh smaller than some predetermined angle (for example 5 degrees); a minimum local feature size smaller than a predetermined threshold; and any angle on any triangle on the surface larger than a predetermined maximum angle (for example, 179 degrees). If a repair step is triggered, then boundary repair operations are performed in step 316. Boundary repair is believed to be needed in only a small fraction of the time increments in a typical moving boundary simulation, and at only very local positions. But when needed, performing the repairs can spell the difference between a useful simulation and one that fails to complete. The details of a preferred boundary repair method are set forth below with respect to FIG. 4.

After any required boundary repair, in step 318, the bulk mesh is updated to coincide with the new boundary positions. The bulk mesh itself can then require repair, for example because mesh movement during oxidation and other moving boundary operations can cause elements in the bulk mesh to be "squashed" or otherwise deformed so that their quality is unacceptable. Local mesh modifications such as face swapping and face splitting operations are too difficult to be done reliably, so in step 320, a global mesh cleanup operation is performed.

Three kinds of operations are performed in step 320: removing vertices in front of encroaching interfaces, adding vertices behind the moving interfaces, and maintaining axis-aligned constraints. In addition, the embodiment synchronizes vertices and axis-aligned constraints between the boundary mesh and the bulk mesh. In performing these operations, the embodiment maintains the connectivity (in this case a Delaunay tetrahedralization) of moving vertices by removing the vertices at old positions and re-inserting them at respective new positions. Both vertex removal and vertex insertion respect Delaunay property of the tetrahedralization by locally changing mesh connectivity around the vertex. This technique prevents the tetrahedralization from getting into a forbidden configuration which can cause the subsequent meshing to fail.

The embodiment determines when to insert new points behind the moving interfaces by keeping track of the old positions of vertices on the moving interfaces, and when a vertex has moved far enough from the old position, a new vertex is inserted at the old position.

The embodiment also introduces face constraints in order to preserve both the Delaunay property of the mesh and good refinement simultaneously. For anisotropic axis-aligned meshes, points are generally aligned in rows with close spacing in the row and large spacing between rows. However, when a new point must be inserted at a location other than one of the rows (because of boundary fitting for example), satisfying the Delaunay property can cause loss of refinement in the vicinity of the new point. Such a "mesh hole" is caused by face flipping to maintain the Delaunay property. To avoid this problem the embodiment constrains the faces from flipping, and instead introduces a new row or rows of points, as many as necessary to maintain the Delaunay property.

Additionally, as vertices are removed in front of encroaching interfaces, the axis-aligned constraints are maintained to the extent possible. But removal of a vertex also removes the incident face constraint in the volume mesh. If the moving interfaces get too close to some axis-aligned constraints, the embodiment will remove the constraints to guarantee success of subsequent meshing steps.

During this cleanup step, field values are interpolated for inserted vertices, and to the vertices surrounding one that has been removed. The embodiment, however, preferably retains as many vertices as possible from the prior bulk mesh, in their same positions. Where the new bulk mesh vertices match the positions of the prior vertices, field values simply can be copied to the new mesh without risk of dose loss or numerical errors introduced by interpolation.

After the bulk mesh has been cleaned up, in step 322 the system proceeds to step 246 (FIG. 2) to determine whether another time increment is needed in the simulation.

As mentioned, step 316 (FIG. 3) for applying surface repair operations on the boundary mesh, is performed to smooth the boundary mesh when certain critical events are detected such as sharp ridges or when a self-intersection is about to occur. There are many ways to smooth such features once the desirability to do so is recognized. One method is to apply a low pass filter over the entire boundary mesh. Typical low pass filters can be computationally expensive, however. The preferred embodiment is able to minimize such computations by using a form of filter which will preserve most parts of the geometry unchanged except where the problematical features exist.

Figure 4:
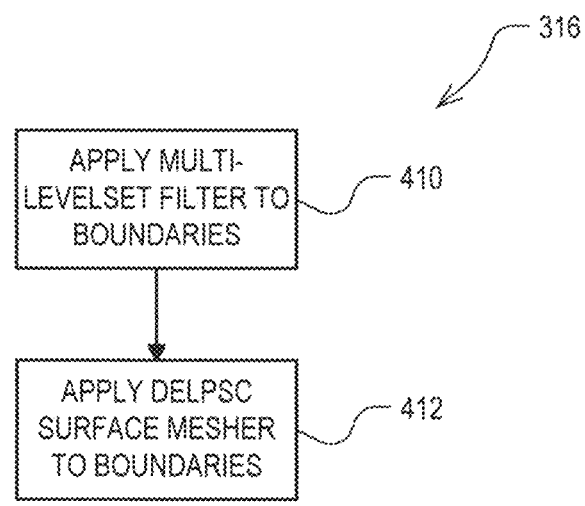

FIG. 4 is a flow chart of a preferred method to repair the boundary mesh. It comprises two steps: a multi-level set ("MLS") filter step 410, and a Delaunay refinement step 412 for piecewise smooth complex ("DelPSC"). Whereas a level set filter might conventionally be solved on a fixed grid everywhere in a structure, in the present embodiment the grid is broken up into chunks and the steps of FIG. 4 are performed only within chunks which contain a material interface. In other chunks, the level set is approximated. As a result, the boundary repair operation tends to alter only a very few vertices, thereby tending to preserve the vast majority of vertices in the bulk mesh. Additionally, the fact that they are triggered only when necessary (step 314) is highly desirable because they are computationally expensive, and because the first time they are called during a simulation they can introduce a large increase in the number of mesh vertices which can slow down other parts of the simulation.

Generally speaking, a level set method is one that represents an evolving contour or surface using a signed distance function, where its zero level corresponds to the actual contour or surface. On one side of the surface, the function is positive and becomes more positive at greater distances from the surface. On the other side of the surface, the function is negative and becomes more negative at greater distances from the surface. Thus by defining a grid in which the surface lies, one can locate the position of the surface by walking each grid line in the direction of reducing magnitude until the zero level is found.

Figure 5:
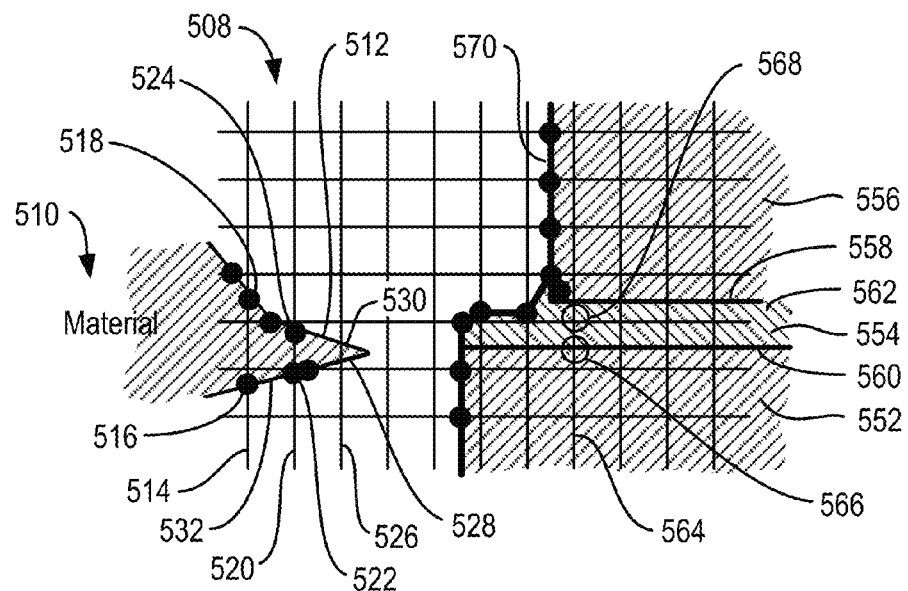
FIG. 5 is a diagram useful for illustrating the operation of a level set smoothing operation.

A level set method can operate as a local smoothing function by defining the grid with fine but not too fine resolution. FIG. 5 illustrates this in two dimensions. On a fine grid 508, the left hand side of the drawing shows a material 510 with a knife edge 512. For illustration purposes, assume that points within the material 510 have negative values whereas points outside the material have positive values. In the smoothing process, a computer system starts (for example) at the bottom left of the drawing, on vertical grid line 514. The function value is positive in the starting position, because it is outside the material 510. As the system walks upwards along grid line 514 the function value reduces until it reaches zero at point 516, indicating a position of the interface. As the system continues walking upwards along grid line 514 the function value continues reducing until it reaches a negative value of maximum magnitude, and then starts increasing again as it continues moving toward the opposite surface of the material 510. Eventually it reaches zero again at point 518, indicating another position of the interface. As the system continues moving upwards along grid line 514 the function value continues becoming more positive until it eventually starts to reduce again as it moves toward another material boundary (not shown), and so on. The walk along grid line 514 thus produces two points 516 and 518 on the boundary interface of material 510.

The system then walks the next vertical grid line 520 in the same way, and produces two more points 522 and 524 on the interface boundary of material 510. However, when the system walks up the next vertical grid line 526, it encounters two boundary points 528 and 530 which are spaced more closely than one grid increment. Thus the system does not record those points.

All the grid lines in the region are walked in this way, both horizontally and vertically. The resulting collection of discovered boundary points are then connected together point-by-point to define the new boundary 532 of the material 510. It can be seen in the example of FIG. 5 that since there were no points recorded at the tip of the knife edge 512, the boundary has effectively been smoothed to eliminate the knife edge. Furthermore, the correction has been made with very high locality, thereby minimizing the number of bulk mesh vertex positions that will have to be deleted, added or moved when the bulk mesh is regenerated from the new position of the boundary. It can be seen that the grid spacing should be fine enough to capture sufficient detail, but not so fine that knife edges and other undesirable features are not removed.

In the extension to three dimensional models, the interfaces shown in FIG. 5 as lines instead are surfaces. The two-dimensional grid of FIG. 5 thus repeats on multiple planes forward and behind the page surface. In addition, a second two-dimensional grid is walked, whose grid lines are oriented perpendicularly to the page. This second grid, too, is walked in both horizontal and vertical increments.

Figure 6:
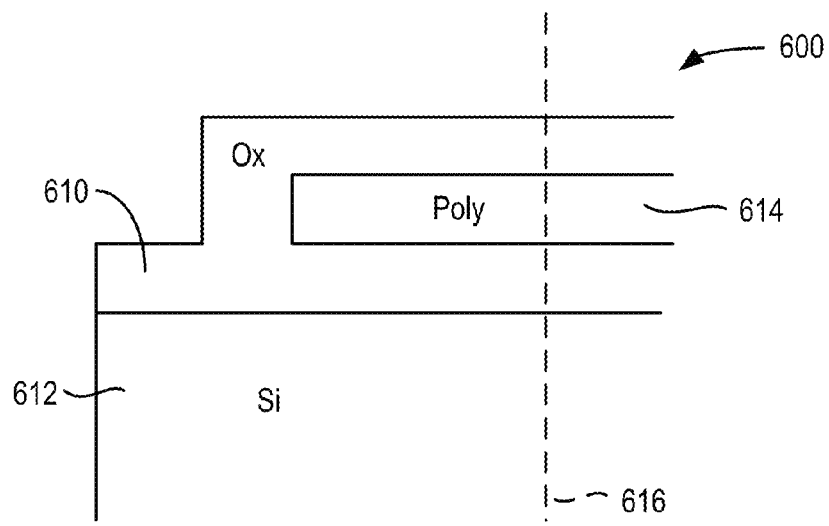
FIG. 6 is a cross-sectional diagram of a portion of an integrated circuit device undergoing a process step.

The level set smoothing method works well when only a single material is involved, or a boundary between only two materials. Many semiconductor fabrication process simulations, however, involve three or more materials. In FIG. 6, for example, a body 600 is shown having an oxide layer 610 formed over a silicon layer 612, and a polysilicon layer 614 formed above the oxide layer 610. Further oxide has then been deposited so that oxide is present both above and below, as well as next to, the polysilicon layer 614.

To accommodate structures like this, a modified version of the level set method, referred to herein as a multi-level set method ("MLS") is used. Since three materials are involved in the example of FIG. 6, a 3-vector is used to represent the level set value of each point in the body, for example <Si, Oxide, Poly>. As a grid line is walked, for example grid line 616, each point is given a value for silicon (negative within layer 612 and positive outside it), a value for oxide (negative within layer 610 and positive outside it), and a value for polysilicon (negative within layer 614 and positive outside it). As in the simpler algorithm of FIG. 5, each value is more negative for points more deeply within the respective material, and more positive for points outside and farther away from the respective material. Each value is zero at a boundary of the respective material. In this way, the system can walk a three-dimensional grid to determine the boundary interfaces of each of the materials, smoothing out knife edges by the same mechanism as described above with respect to FIG. 5.

It will be appreciated that sometimes a method such as this can indicate two different positions for an interface: one indicating where one material terminates and another indicating where the other material begins. Any mechanism can be used to resolve these discrepancies. Preferably, however, discrepancies are avoided by considering the vector element that is most negative at any given point, to indicate the material within which the point lies.

The multi-level set method also handles topological changes to the boundary mesh that arise during the simulated process step, such as the merging of boundaries. Referring again to FIG. 5, the right hand side shows a lower material 552. A second layer 554 resides above layer 552, and a third layer 556, of the same material as layer 552, resides above layer 554. In the current time increment in the process simulation, the boundary between materials 552 and 554 has moved upwards: material 552 is merging with material 556 and material 554 is being consumed. Line 558 in the drawing represents the lower boundary of the upper material 556, and line 560 represents the upper boundary of the lower material 552 prior to the current time increment. Line 562 represents the upper boundary of the lower material 552 after the current time increment. It can be seen that after the current time increment, the lower boundary 558 of the upper material 556 and the upper boundary 562 of the lower material 552 are less than one grid spacing apart. Therefore, when the system walks up one of the vertical grid lines, for example grid line 564, it encounters two boundary points 566 and 568 which are spaced more closely than one grid increment. Thus the system does not record those points. Later, when the collection of boundary points recorded by the grid walking technique are connected together point-by-point, a new boundary contour 570 arises which omits lines 558 and 562. The new boundary contour thereby captures a structure that is topologically different from prior to the current time increment. Again, note that the topological change has been made with very high locality, thereby minimizing the number of bulk mesh vertex positions that will have to be deleted, added or moved when the bulk mesh is regenerated from the new position of the boundary. The level set method illustrated for two materials on the right hand side of FIG. 5 can be extended to a multi-level set method involving multiple materials, in the same way as described above with respect to the process on the left hand side of FIG. 5.

The speed of the MLS step is enhanced in one embodiment by representing the body in the vicinity of the feature to be smoothed in a compressed, chunk-by-chunk data structure. The data structure exploits an observation that most chunks contain uniform data, and in the rest of the chunks, most contain data that can be represented by a linear function with little loss of accuracy. In most operations, the compressed data are handled directly, so decompression and traversal of data cells are avoided. Such a data structure can greatly reduce the memory and CPU time required to perform the MLS step, thereby increasing its speed.

The MLS step 410 thus smoothes problematical knife edge geometries, and handles topological changes such as the merging of materials due to front collision. It also handles topological changes arising from other effects such as front separation, as well as removing high frequency numeric noise. However, in order to work well the grid 508 (FIG. 5) must be very fine. It therefore results in a highly refined new boundary representation with many more points, and many small features and small angles. Step 412 takes the MLS output and produces a coarser surface mesh with better quality for computational efficiency and to improve bulk mesh reliability.

Step 412 is a surface mesher which is an extension of the known algorithm DelPSC algorithm described, for example, in the following references both incorporated by reference herein: T. K. Dey and J. Levine, Delaunay meshing of piecewise smooth complexes without expensive predicates, Algorithms, vol. 2, issue 4 (2009), 1327-1349, doi:10.3390/a2041327, Technical report OSU-CISRC-7108-TR40, July, 2008; and S. W. Cheng, T. K. Dey, J. A. Levine, A practical Delaunay meshing algorithm for a large class of domains, Proc. Internat. Meshing Roundtable (2007), 477-494. Roughly described, Delaunay tetrahedralization is an extension to three dimensions of Delaunay triangulation, which is a meshing of a plurality of points so as to produce triangles of high quality. In this context high quality means avoiding "skinny" triangles by maximizing the minimum angles of all the angles in the triangles. A Delaunay triangulation can be found by interconnecting the points such that none of the points are inside the circumcircle of any of the triangles. In the extension to three dimensions, a Delaunay tetrahedralization is a meshing of a plurality of points so as to produce tetrahedrons of similarly high quality. A Delaunay tetrahedralization can be found by interconnecting the points such that none of the points are inside the circumsphere of any of the tetrahedrons. A Delaunay refinement step inserts a point into a Delaunay tetrahedralization to improve the quality of the tetrahedrons and the triangles between pairs of tetrahedrons. A Delaunay refinement step for a piecewise smooth complex inserts appropriate points on the surface into a Delaunay tetrahedralization and extracts the triangles between two tetrahedrons on different sides of the surface.

Conventional DelPSC algorithms typically operate by iteratively inserting vertices into Delaunay tetrahedralization and extracting surface triangles satisfying certain criteria. However, the known algorithms do not handle multiple materials well, and also cannot handle thin layers of material well. Step 412, therefore, extends conventional DelPSC algorithms to support multiple materials with thin layers. In the embodiment of FIG. 4, the algorithm is improved by partitioning the input complex so that the two sides of a thin layer reside in two different partitions. A conventional DelPSC step is then performed on each partition independently under the condition that they respect the common ridge sampling on their boundaries in order to guarantee conformity across partitions.

Because the underlying surface of the new boundary representation may be slightly different from the prior boundary representation, potential conflicts with existing axis-aligned face constraints may require resolution. The system removes any face constraint that intersects or becomes too close to the new boundary representation before the new boundary representation is integrated into the bulk mesh.

Figure 7:
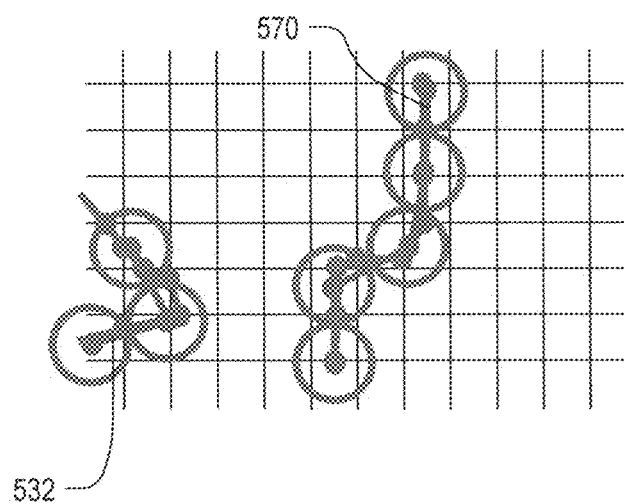
FIG. 7 is a diagram useful for illustrating the operation of a Delaunay refinement step for piecewise smooth complex FIGS. 8A and 8B (collectively FIG. 8) illustrate examples of a boundary mesh after applying the multi-level set filter of step 410 and after a subsequent DelPSC step 412, respectively.

FIG. 7 illustrates the boundaries 532 and 570 discovered in FIG. 5, after the DelPSC step 412. In particular, the resulting boundary representation identifies only those points on the boundary 532 or 570 which are centerpoints of the non-overlapping circles shown. Again, FIG. 7 illustrates the principle in two dimensions; in three dimensions the circles are replaced by spheres.

While only one interface is shown on the left hand side of FIG. 5, and two interfaces are shown (merging into one) on the right hand side of FIG. 5, it will be understood that in general a body undergoing a process step will include many interfaces. Additionally, due to topological changes, neither the number of interfaces nor the number of surfaces need necessarily be the same before and after each time increment. Nor is there a necessary one-to-one relationship between interfaces and the boundary meshes that represent them, since the interface between two materials may be represented in some embodiments using more than one boundary mesh covering different portions of the interface. In order to accommodate this situation, as used herein a boundary "mesh" representing an "interface" between two materials can be made up of multiple mesh portions, each of which is also considered herein to constitute a "mesh".

FIGS. 8A and 8B (collectively FIG. 8) illustrate examples of a boundary mesh after applying the MLS filter of step 410 and after a subsequent DelPSC step 412, respectively. In these images the meshes shown are surface meshes only, and define triangles rather than tetrahedrons. The different colors or shadings in the figures represent different material surfaces. It can be seen that the MLS filter of step 410 in the illustration shown yields numerous finely spaced mesh vertices, which can slow down subsequent steps in the simulation. The DelPSC step 412, on the other hand, yields a much coarser mesh which is much more suitable to the subsequent simulation steps. Because of the smoothing performed in step 410, the bulk mesh regenerated from the boundary mesh of FIG. 8B will not have the low quality tetrahedrons which triggered the smoothing operation, and the simulation will continue with a high probability of success.

Integrated Circuit Manufacturing Flow

Figure 9:
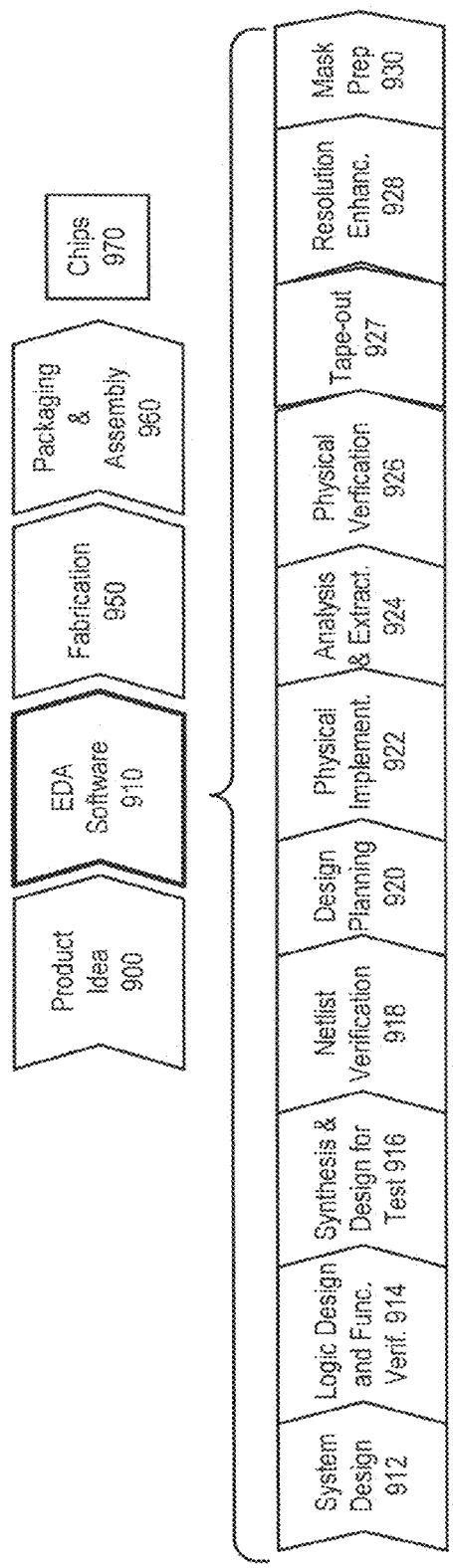
FIG. 9 is a simplified representation of an illustrative digital integrated circuit design flow.

FIG. 9 shows a simplified representation of an illustrative integrated circuit design flow incorporating features of the technology. At a high level, the process starts with the product idea (step 900) and is realized in an EDA (Electronic Design Automation) software design process (step 910). When the design is finalized, it can be taped-out (step 940). After tape out, the fabrication process (step 950) and packaging and assembly processes (step 960) occur resulting, ultimately, in finished integrated circuit chips (result 970).

The EDA software design process (step 910) is actually composed of a number of steps 912-930, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the components steps of the EDA software design process (step 910) will now be provided.

System design (step 912): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 914): At this stage, the VHDL or Verilog code for modules in the system is written and the design is checked for functional accuracy. More specifically, the design is checked to ensure that produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (step 916): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Compiler, FPGA Compiler, Tetramax, and DesignWare® products.

Netlist verification (step 918): At this step, the netlist is checked for compliance with timing constraints and for correspondence with the VHDL/Verilog source code.

Example EDA software products from Synopsys, Inc. that can be used at this step include Formality, PrimeTime, and VCS products.

Design planning (step 920): Here, an overall floor plan for the chip is constructed and analyzed for timing and top-level routing. Example EDA software products from Synopsys, Inc. that can be used at this step include Astro and IC Compiler products.

Physical implementation (step 922): The placement (positioning of circuit elements) and routing (connection of the same) occurs at this step. Example EDA software products from Synopsys, Inc. that can be used at this step include the Astro and IC Compiler products.

Analysis and extraction (step 924): At this step, the circuit function is verified at a transistor level, this in turn permits what-if refinement. Example EDA software products from Synopsys, Inc. that can be used at this step include Astro-Rail, PrimeRail, Primetime, and Star RC/XT products.

Physical verification (step 926): At this step various checking functions are performed to ensure correctness for: manufacturing, electrical issues, lithographic issues, and circuitry. Example EDA software products from Synopsys, Inc. that can be used at this step include the Hercules product.

Tape-out (step 927): This step provides the "tape out" data for production of masks for lithographic use to produce finished chips. Example EDA software products from Synopsys, Inc. that can be used at this step include the CATS® family of products.

Resolution enhancement (step 928): This step involves geometric manipulations of the layout to improve manufacturability of the design. Example EDA software products from Synopsys, Inc. that can be used at this step include Proteus, ProteusAF, and PSMGen products.

Mask data preparation (step 930): This step provides the "tape-out" data for production of masks for lithographic use to produce finished chips. Example EDA software products from Synopsys, Inc. that can be used at this step include the CATS® family of products.

A typical integrated circuit manufacturing flow also includes a parallel flow, as follows:

(1) Develop individual process steps for manufacturing the integrated circuit. This can be modeled with the Synopsys tools "Sentaurus Process", "Sentaurus Topography", and "Sentaurus Lithography". The input information here include masks or layout information, and process conditions like temperature, reactor ambient, implant energy, etc. The output information is the final geometry or doping profiles or stress distribution. Aspects of the invention can be used in this step of the manufacturing flow.

(2) Integrate the individual process steps into the complete process flow. This can be modeled with the Synopsys tool "Sentaurus Process". The input information here includes the layout information and the collection of the process steps in the appropriate sequence. The output includes the geometry, the doping profiles, and the stress distribution for the transistors and the space in between the transistors. Aspects of the invention can be used also in this step of the manufacturing flow.

(3) Analyze performance of the transistor manufactured with this process flow. This can be done with the Synopsys tool "Sentaurus Device". The input information here includes the output of step (2) and the biases applied to transistor terminals. The output information includes the currents and capacitances for each bias combination.

(4) If necessary, modify the process steps and the process flow to achieve the desired transistor performance. This can be done iteratively by using the Synopsys tools mentioned above.

Once the process flow is ready, it can be used for manufacturing multiple circuit designs coming from various designers in various companies. The EDA flow 912-930 will be used by such designers. The parallel flow described here is used at a foundry to develop a process flow that can be used to manufacture designs coming from the designers. A combination of the process flow and the masks made from step 930 are used to manufacture any particular circuit. If the designers are at a different company, e.g. a fabless company, then usually it is the foundry that performs this parallel process flow whereas the process steps of FIG. 9 are performed typically by the fabless company. If the integrated circuit is manufactured at an IDM (integrated device manufacturer) company instead of the combination of a fabless company and a foundry, then both parallel flows described above are done at the same IDM company.

There is also a bridge between these tools and the 912-930 EDA tools. The bridge is a Synopsys tool "Seismos" that applies compact proximity models for particular circuit design and layout to obtain netlist with instance parameters for each individual transistor in the circuit as a function of its neighborhood and stress, including material conversion stress. This netlist is used in the analysis step 924.

Computer System

Figure 10:
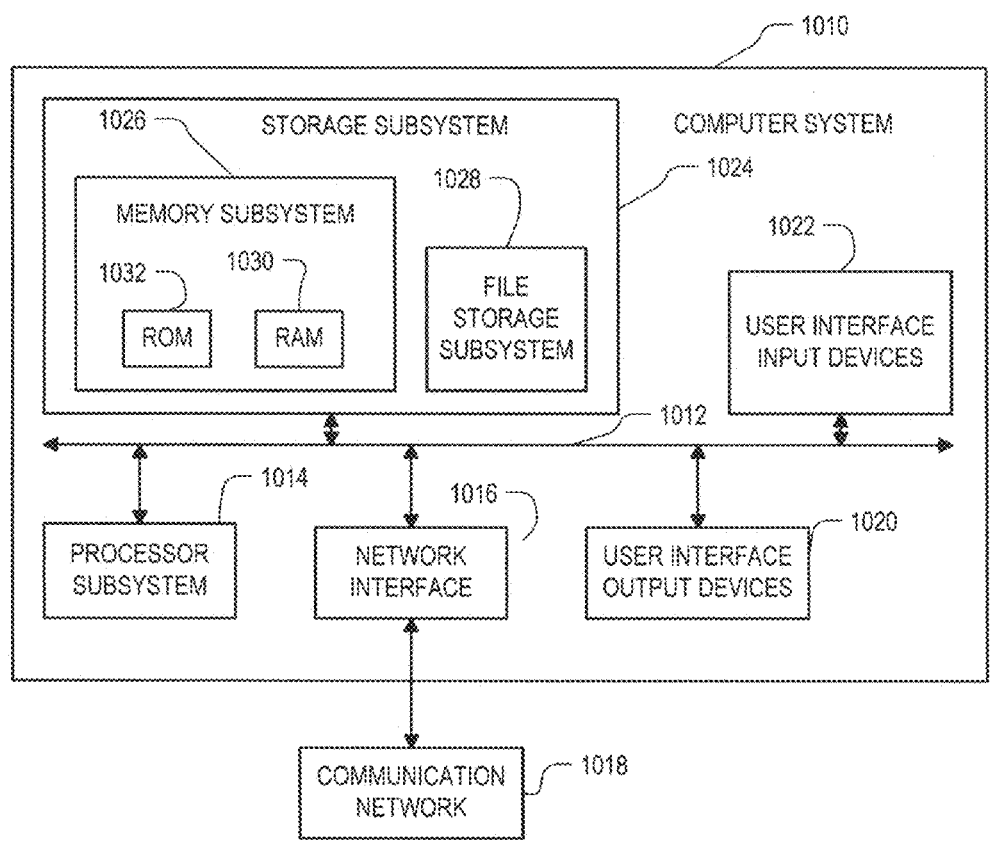
FIG. 10 is a simplified block diagram of a computer system that can be used to implement aspects of the invention.

FIG. 10 is a simplified block diagram of a computer system 1010 that can be used to implement software incorporating aspects of the present invention. While FIGS. 2-4 indicate individual steps carrying out specified operations, it will be appreciated that each step is actually implemented with software instructions that cause the computer system 1010 to operate in the specified manner. The group of software instructions and data to implement a particular step, in conjunction with the processing subsystem and other components of the computer system which enable such software instructions to be executed, constitute a module which implements the particular step.

Computer system 1010 typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks, including an interface to communication network 1018, and is coupled via communication network 1018 to corresponding interface devices in other computer systems. Communication network 1018 may comprise many interconnected computer systems and communication links. These communication links may be wireline links, optical links, wireless links, or any other mechanisms for communication of information. While in one embodiment, communication network 1018 is the Internet, in other embodiments, communication network 1018 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1010 or onto computer network 1018.

User interface output devices 1020 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 1010 to the user or to another machine or computer system.

Storage subsystem 1024 stores the basic programming and data constructs that provide the functionality of certain embodiments of the present invention. For example, the various modules implementing the functionality of certain embodiments of the invention may be stored in storage subsystem 1024. These software modules are generally executed by processor subsystem 1014. Storage subsystem 1024 also represents storage accessible to the computer system on which the various databases mentioned herein are stored. In another embodiment some or all of the databases are located on storage accessible to the computer system via the network 1018.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1028. The host memory 1026 contains, among other things, computer instructions which, when executed by the processor subsystem 1014, cause the computer system to operate or perform functions as described herein. As used herein, processes and software that are said to run in or on "the host" or "the computer", execute on the processor subsystem 1014 in response to computer instructions and data in the host memory subsystem 1026 including any other local or remote storage for such instructions and data.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer system 1010 itself can be of varying types including a personal computer, a portable computer, a workstation, a computer terminal, a network computer, a television, a mainframe, a server farm, or any other data processing system or user device. Due to the ever changing nature of computers and networks, the description of computer system 1010 depicted in FIG. 10 is intended only as a specific example for purposes of illustrating certain embodiments of the present invention. Many other configurations of computer system 1010 are possible having more or less components than the computer system depicted in FIG. 10.

As used herein, the term "database" does not necessarily imply any unity of structure. For example, two or more separate databases, when considered together, still constitute a "database" as that term is used herein.

Also as used herein, the "identification" of an item of information does not necessarily require the direct specification of that item of information. Information can be "identified" by referring to the actual information through one or more layers of indirection, or by identifying one or more items of different information which are together sufficient to determine the actual item of information. In addition, the term "indicate" is used herein to mean the same as "identify".

Also as used herein, a given value is "responsive" to a predecessor value if the predecessor value influenced the given value. If there is an intervening processing step, the given value can still be "responsive" to the predecessor value. If the intervening processing step combines more than one value, the output of the processing step is considered "responsive" to each of the value inputs. If the given value is the same as the predecessor value, this is merely a degenerate case in which the given value is still considered to be "responsive" to the predecessor value. "Dependency" of a given value upon another value is defined similarly.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. As one example, whereas the embodiment of FIG. 4 implements boundary repair operations using a three-dimensional level set grid, resulting in a modified boundary mesh representation lacking any two points nearer to each other in each dimension than the spacing between lines in the grid, it will be appreciated that in another embodiment the boundary repair operation can result in a modified boundary mesh representation lacking any two points nearer to each other in Euclidean distance. In addition, and without limitation, any and all variations described, suggested or incorporated by reference in the Background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A system for simulating a process step in manufacture of an integrated circuit device through a plurality of time increments, comprising:
a memory; and
a data processor coupled to the memory, the data processor configured to:
represent a body with a three-dimensional bulk mesh, the bulk mesh identifying a pre-increment set of at least one materials interface;
evolve the body by simulation through a time increment of the process step, the simulation identifying a post-increment set of at least one materials interface;
represent each of the interfaces in the post-increment set of interfaces with a boundary mesh representation separate from the bulk mesh;
smooth the boundary mesh representation of at least one of the interfaces in the post-increment set of interfaces;
regenerate at least part of the bulk mesh in dependence upon the smoothed boundary mesh; and
continue the simulation of the process step.

2. A system according to claim 1, wherein the bulk mesh includes a plurality of vertices which, prior to evolving the body, identify one of the interfaces in the pre-increment set of materials interfaces,
wherein the evolution develops a duration for the time increment and a velocity for movement during the time increment of each of the vertices,
and wherein in representing each of the interfaces in the post-increment set of interfaces with a boundary mesh representation, the data processor is further configured to update a pre-increment version of the boundary mesh representation in dependence upon the time increment and the velocity for movement during the time increment of each of the vertices.

3. A system according to claim 1, wherein in smoothing the boundary mesh representation, the data processor is further configured to modify the boundary mesh representation of interfaces in the post-increment set of interfaces so that no two points remain on the boundary mesh representation which are nearer to each other in a first dimension in 3-space than a first predetermined distance.

4. A system according to claim 3, wherein in smoothing the boundary mesh representation, the data processor is further configured to:
modify the boundary mesh representation of interfaces in the post-increment set of interfaces so that no two points remain on the boundary mesh representation of interfaces in the post-increment set of interfaces which are nearer to each other in a second dimension in 3-space than a second predetermined distance, the second dimension being perpendicular to the first dimension; and
modify the boundary mesh representation of interfaces in the post-increment set of interfaces so that no two points remain on the boundary mesh representation of interfaces in the post-increment set of interfaces which are nearer to each other in a third dimension in 3-space than a third predetermined distance, the third dimension being perpendicular to both the first and second dimensions.

5. A system according to claim 4, wherein the first, second and third distances are equal.

6. A system according to claim 3, wherein the modified boundary mesh representation has no two points of a continuous interface between first and second materials, which points are nearer to each other in the first dimension in 3-space than the first predetermined distance.

7. A system according to claim 3, wherein the modified boundary mesh representation has no dihedral angles smaller than a predetermined angle.

8. A system according to claim 3, wherein for each pair of points on the modified boundary mesh which are nearer to each other in the first dimension in 3-space than the first predetermined distance, yet are located on different interfaces, the different interfaces are connected with each other by other interfaces in the post-increment set of interfaces.

9. A system according to any of claims 3-8, wherein the data processor is further configured to perform Delaunay refinement for piecewise smooth complex on the modified boundary interface representation.

10. A system according to claim 1, wherein the boundary mesh representation of interfaces in the post-increment set of interfaces includes a boundary mesh representation of a particular interface,
and wherein in smoothing the boundary mesh representation, the data processor is further configured to modify the boundary mesh representation of the particular interface so that no two points remain on the boundary mesh representation of the particular interface which are nearer to each other in a first dimension in 3-space than a first predetermined distance.

11. A system according to claim 1, wherein in continuing the simulation of the process step, the data processor is configured to repeat the steps of evolving, representing and regenerating.

12. A system according to claim 11, wherein in continuing the simulation of the process step, the data processor is configured to repeat the step of smoothing.

13. A system according to claim 1, wherein in continuing the simulation of the process step, the data processor is configured to:
simulate evolution of the body through a second time increment of the process step, thereby identifying a second post-increment set of at least one materials interface;
update the boundary mesh representation to represent each of the interfaces in the second post-increment set;
regenerate at least part of the bulk mesh in dependence upon the updated boundary mesh, without smoothing the boundary mesh; and
further continue the simulation.

14. A system according to claim 1, wherein in continuing the simulation of the process step, the data processor is configured to:
simulate evolution of the body through a second time increment of the process step, thereby identifying a second post-increment set of at least one materials interface;
update the boundary mesh in the boundary mesh representation to represent each of the interfaces in the second post-increment set;
determine whether the updated boundary mesh violates a predetermined definition of minimum quality;
if the updated boundary mesh is determined to violate the predetermined definition of minimum quality then:

smooth the updated boundary mesh representation of at least one of the interfaces in the second post-increment set of at least one materials interface, and regenerate at least part of the bulk mesh in dependence upon the smoothed updated boundary mesh representation of at least one of the interfaces in the second post-increment set of at least one materials interface;

if the updated boundary mesh is determined to not violate the predetermined definition of minimum quality then regenerate at least part of the bulk mesh in dependence upon the updated boundary mesh representation of at least one of the interfaces in the second post-increment set of at least one materials interface, without smoothing the updated boundary mesh representation; and further continue the simulation.

15. A system according to claim 1, wherein the data processor is further configured to determine whether, after representing each of the interfaces with a boundary mesh representation and before regenerating at least part of the bulk mesh, the boundary mesh violates a predetermined definition of minimum quality.

16. A system according to claim 15, wherein the predetermined definition of minimum quality requires at least one member of the group of conditions consisting of:
    absence of dihedral angles in the boundary mesh smaller than a predetermined angle;
    absence of feature sizes smaller than a predetermined threshold; and
    absence of angles on triangles on the boundary mesh larger than a predetermined maximum angle.

17. A system according to claim 1, wherein the process step is one in which at least a particular one of interfaces in the pre-increment set of materials interfaces moves during the process step.

18. A system according to claim 17, wherein the simulation of the process step further simulates dopant diffusion during the process step.

19. A system according to claim 17, wherein the simulation of the process step further solves dose conserving diffusion and dopant segregation adjacent to the particular interface.

20. A system according to claim 1, wherein the process step comprises a member of the group consisting of oxidation, silicidation, doped epitaxial deposition, amorphization and epitaxial crystallization.

21. A system according to claim 1, wherein in smoothing the boundary mesh representation, the data processor is further configured to modify the boundary mesh representation of interfaces in the post-increment set of interfaces so that no two points remain on the boundary mesh representation which are nearer to each other in Euclidean distance than a first predetermined distance.

22. A method for simulating an integrated circuit device manufacturing process step through a plurality of time increments, comprising:
    representing a body with a three-dimensional bulk mesh, the bulk mesh identifying a pre-increment set of at least one materials interface;
    simulating evolution of the body through a time increment of the process step, the simulation identifying a post-increment set of at least one materials interface;
    representing each of the interfaces in the post-increment set of interfaces with a boundary mesh representation separate from the bulk mesh;
    smoothing the boundary mesh representation of at least one of the interfaces in the post-increment set of interfaces;
    regenerating at least part of the bulk mesh in dependence upon the smoothed boundary mesh representation; and
    continuing the simulation.

23. A method according to claim 22, wherein the smoothing step comprises modifying the boundary mesh representation of interfaces in the post-increment set of interfaces so that no two points remain on the boundary mesh representation which are nearer to each other in a first dimension in 3-space than a first predetermined distance.

24. A method according to claim 23, wherein the modified boundary mesh representation has no two points of a continuous interface between first and second materials, which two points are nearer to each other in the first dimension in 3-space than the first predetermined distance.

25. A method according to claim 24, wherein for each pair of points on the modified boundary mesh which are nearer to each other in the first dimension in 3-space than the first predetermined distance, yet are located on different interfaces, the different interfaces are connected with each other by other interfaces in the post-increment set of interfaces.

26. A method according to claim 23, further comprising a step of performing a Delaunay refinement step for piecewise smooth complex on the modified boundary interface representation.

27. A method according to claim 22, wherein the step of continuing the simulation comprises:
    simulating evolution of the body through a second time increment of the process step, thereby identifying a second post-increment set of at least one materials interface;
    updating the boundary mesh to represent each of the interfaces in the second post-increment set;
    regenerating at least part of the bulk mesh in dependence upon the updated boundary mesh, without smoothing the boundary mesh; and
    further continuing the simulation.

28. A method according to claim 22, further comprising determining that, after the step of representing each of the interfaces with a boundary mesh representation and before the step of regenerating at least part of the bulk mesh, the boundary mesh violates a predetermined definition of minimum quality.

29. A method according to claim 22, wherein the process step is one in which at least a particular one of interfaces in the pre-increment set of materials interfaces moves during the process step,
    and wherein the simulation further simulates dopant diffusion during the process step.

30. A method according to claim 22, wherein the process step is one in which at least a particular one of interfaces in the pre-increment set of materials interfaces moves during the process step,
    and wherein the simulation further solves dose conserving diffusion and dopant segregation adjacent to the particular interface.

31. A method according to claim 22, wherein the process step comprises a member of the group consisting of oxidation, silicidation, doped epitaxial deposition, amorphization and epitaxial crystallization.

32. A computer readable medium having stored thereon in a non-transitory manner a plurality of software code portions which when executed by a processor simulate an integrated circuit device manufacturing process step through a plurality of time increments, the simulation comprising:

representing a body with a three-dimensional bulk mesh, the bulk mesh identifying a pre-increment set of at least one materials interface;

simulating evolution of the body through a time increment of the process step, the simulation identifying a post-increment set of at least one materials interface;

representing each of the interfaces in the post-increment set of interfaces with a boundary mesh representation separate from the bulk mesh;

smoothing the boundary mesh representation of at least one of interfaces in the post-increment set of interfaces;

regenerating at least part of the bulk mesh in dependence upon the smoothed boundary mesh representation; and continuing the simulation.

33. A computer readable medium according to claim 31, wherein the smoothing step comprises modifying the boundary mesh representation of interfaces in the post-increment set of interfaces so that no two points remain on the boundary mesh representation which are nearer to each other in a first dimension in 3-space than a first predetermined distance.

34. A computer readable medium according to claim 33, wherein the modified boundary mesh representation has no two points of a continuous interface between first and second materials, which two points are nearer to each other in the first dimension in 3-space than the first predetermined distance.

35. A computer readable medium according to claim 33, wherein for each pair of points on the modified boundary mesh which are nearer to each other in the first dimension in 3-space than the first predetermined distance, yet are located on different interfaces, the different interfaces are connected with each other by other interfaces in the post-increment set of interfaces.

36. A computer readable medium according to claim 33, further comprising a step of performing a Delaunay refinement step for piecewise smooth complex on the modified boundary interface representation.

37. A computer readable medium according to claim 31, wherein the step of continuing the simulation comprises:

simulating evolution of the body through a second time increment of the process step, thereby identifying a second post-increment set of at least one materials interface;

updating the boundary mesh to represent each of the interfaces in the second post-increment set;

regenerating at least part of the bulk mesh in dependence upon the updated boundary mesh, without smoothing the boundary mesh; and further continuing the simulation.

38. A computer readable medium according to claim 31, further comprising determining that, after the step of representing each of the interfaces with a boundary mesh representation and before the step of regenerating at least part of the bulk mesh, the boundary mesh violates a predetermined definition of minimum quality.

39. A computer readable medium according to claim 31, wherein the process step is one in which at least a particular one of interfaces in the pre-increment set of materials interfaces moves during the process step, and wherein the simulation further simulates dopant diffusion during the process step.

40. A computer readable medium according to claim 31, wherein the process step is one in which at least a particular one of interfaces in the pre-increment set of materials interfaces moves during the process step, and wherein the simulation further solves dose conserving diffusion and dopant segregation adjacent to the particular interface.

41. A computer readable medium according to claim 31, wherein the process step comprises a member of the group consisting of oxidation, silicidation, doped epitaxial deposition, amorphization and epitaxial crystallization.

\* \* \* \* \*

UNITED STATES PATENT AND TRADEMARK OFFICE
CERTIFICATE OF CORRECTION

PATENT NO. : 9,477,798 B1  
APPLICATION NO. : 13/507310  
DATED : October 25, 2016  
INVENTOR(S) : Damrong S. Guoy et al.

Page 1 of 1

It is certified that error appears in the above-identified patent and that said Letters Patent is hereby corrected as shown below:

In the Claims

At Column 22, Claim 25, Line 18, replace "24" with --23--.

At Column 23, Claim 33, Line 15, replace "31" with --32--.

Signed and Sealed this
Seventeenth Day of January, 2017

Michelle K. Lee
*Director of the United States Patent and Trademark Office*